United States Patent
Mitsuyasu et al.

(10) Patent No.: US 8,064,565 B2
(45) Date of Patent: Nov. 22, 2011

(54) REACTOR CORE

(75) Inventors: Takeshi Mitsuyasu, Hitachi (JP); Motoo Aoyama, Mito (JP); Kazuya Ishii, Hitachi (JP); Masao Chaki, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 0 days.

(21) Appl. No.: 12/624,815

(22) Filed: Nov. 24, 2009

(65) Prior Publication Data

US 2010/0128833 A1    May 27, 2010

Related U.S. Application Data

(62) Division of application No. 12/186,560, filed on Aug. 6, 2008, now abandoned.

(30) Foreign Application Priority Data

Aug. 9, 2007  (JP) .................................. 2007-208255

(51) Int. Cl.
G21C 23/00    (2006.01)
(52) U.S. Cl. ......... 376/349; 376/267; 376/434; 376/347
(58) Field of Classification Search .................. 376/349, 376/267, 434, 347
See application file for complete search history.

(56) References Cited

U.S. PATENT DOCUMENTS

| 5,307,387 A | 4/1994 | Nakajima |
| 6,504,889 B1 | 1/2003 | Narita |
| 2008/0152069 A1 | 6/2008 | Aktas |

FOREIGN PATENT DOCUMENTS

| JP | 62-50691 | 3/1987 |
| JP | 07-181280 | * 7/1995 |
| JP | 2007-232505 | 9/2007 |

* cited by examiner

*Primary Examiner* — Ricardo Palabrica
(74) *Attorney, Agent, or Firm* — Antonelli, Terry, Stout & Kraus, LLP.

(57) ABSTRACT

A reactor core, comprising:
an outermost region; a core region surrounded by said outermost region; a plurality of fuel support members, each of which is disposed at a lower end portion of said outermost region and said core region; and a plurality of fuel assemblies loaded in said outermost region and said core region and supported by said fuel support members,
wherein a plurality of fuel assemblies disposed in said core region include a plurality of first fuel assemblies, each of which is inserted into a first coolant passage which is formed in said fuel support member and has a first resistor having an opening, and a plurality of second fuel assemblies, each of which is individually inserted into each of second coolant passage which is formed in said fuel support member and has a second resistor having an opening and a larger pressure loss than that of said first resistor; and,
four fuel assemblies, each of which is adjacent to each of four lateral sides of each of a plurality of first fuel assemblies, include either three or four second fuel assemblies.

7 Claims, 10 Drawing Sheets

SET POWER

REACTOR CORE

CROSS REFERENCE TO RELATED APPLICATION

This application is a divisional application of U.S. application Ser. No. 12/186,560, filed Aug. 6, 2008 now abandoned, the contents of which are incorporated herein by reference.

CLAIM OF PRIORITY

The present application claims priority from Japanese Patent application serial no. 2007-208255, filed on Aug. 9, 2007, the content of which is hereby incorporated by reference into this application.

BACKGROUND OF THE INVENTION

The present invention relates to a reactor core, and more particularly, to a reactor core suitable for the use in a Boiling Water Reactor having an apparatus for adjusting cooling water flow rate.

A fuel assembly used for a Boiling Water Reactor (BWR) includes a plurality of fuel rods and a channel box. Each of the fuel rods is filled with a plurality of fuel pellets including fissile material in the cladding tube, are bundled in a square lattice form. The square channel box encloses the bundled fuel rods. The square channel box has an outer width of about 14 cm and a square cross-section. A core, which is disposed in the reactor pressure vessel of a BWR, is loaded with a plurality of fuel assemblies internally. For nuclear fuel material that is used to a fuel pellet, enriched uranium or plutonium-enriched uranium is used in a chemical form of oxide. Because fuel rods are heated by the heat generated by the nuclear fission of the nuclear fuel material, they are cooled by cooling water (coolant) which is light water supplied to the core. The cooling water is circulated by pump.

Thermal margin is expressed by a minimum critical power ratio (MCPR) and is defined by a value obtained by dividing fuel rod power at which cooling water transits to a film boiling state on the surface of the cladding tube of the fuel rod and heat removal efficiency starts to greatly decrease, by actual reactor power. The fuel rod power is critical power. It is necessary to maintain the thermal margin so that it is equal to or more than a designated value according to design criteria while the reactor is in operation and in a transient state. The thermal margin decreases as core power density increases.

When a reactor is in rated operation, thermal power of fuel assemblies is the lowest in the outermost layer of the core where a large quantity of neutrons leaks. For this reason, in conventional technology, pore diameter of an orifice of the cooling water inlet disposed in the outermost layer region of the core is designed such that the pore diameter is smaller in the inner region than that in the outermost layer region, thereby increasing inflow resistance of the cooling water. In the region of the core other than the outermost layer region, that is, in the inner region where power of fuel assemblies relatively becomes high, the flow rate of the cooling water increases and thermal margin of the core during rated operation can be ensured.

Japanese Patent Laid-open No. Hei 7(1995)-181280 describes the adjustment of the pore diameter of the orifice in the cooling water inlet. In the conventional technology, the core is divided into two regions, inner and outer regions, excluding the outermost layer region, and the pore diameter of the orifice in the coolant inlet located in the region on the outer side of 70% of the core radius in the radial direction is made smaller than the pore diameter of the orifice located in the region (central region) on the inner side of the outer region. To do so, flow rate of cooling water in the region on the inner side of 70% of the core radius where power is relatively high increases, thereby increasing thermal margin of the core. In an embodiment described in Japanese Patent Laid-open No. Hei 7(1995)-181280, fuel assemblies loaded in the core are divided into two groups according to in-core fuel dwelling time, and two types of orifices for the coolant inlets are used to efficiently improve thermal margin. However, in the conventional technology, from a perspective of maximization of thermal margin during rated operation, nothing is considered about the increase in power of the fuel assembly associated with the increase in the flow rate of the cooling water, which will be described later in this document. Further, the division of the core region and the setting of the pore diameter of the orifice in the cooling water inlet are not completely optimized.

SUMMARY OF THE INVENTION

It is necessary to improve thermal margin by providing minimum change of the core system so as to improve power density of the core at low cost. Furthermore, extended cycle operation of the reactor is necessary to improve economical efficiency of fuel; inevitably, a large number of fuel assemblies loaded in the core must be exchanged after the operation cycle has been completed. Roughly, at least 25% of total number of fuel assemblies loaded in the core must be exchanged, and the batch number of fuel exchange is equal to or less than 4. This leads to the increase in the rate of new fuel assemblies that the in-core fuel dwelling time is a first cycle. Therefore, since the number of the fuel assemblies that power is high relatively increases in the core, thermal margin of the core reduces. Accordingly, it is necessary to ensure thermal margin by reducing the power of the fuel assemblies that the in-core fuel dwelling time is the first cycle and becoming flattened the peak of the power in the radial direction of the core.

To reduce power generation cost, it is effective to improve thermal margin by minimizing the change of the core system and improve power density. On the other hand, extended cycle operation is effective for the improvement of the operating rate of the nuclear power plant. In both cases, the number of fuel assemblies to be exchanged is large. Roughly, equal to or more than 25% of fuel assemblies in the core (4 batches or less) must be exchanged under the condition in which enrichment is limited to 5 wt % or less. As stated above, this means that the percentage of high power fuel assemblies relatively increases in the core and the percentage of fuel assemblies which have low thermal margin increases. As stated above, it is necessary to ensure thermal margin by reducing the power of the fuel assemblies that the in-core fuel dwelling time is the first cycle and becoming flattened the peak of the power in the radial direction of the core.

As a method for improving thermal margin, it is contemplated to use an apparatus for adjusting the flow rate of the cooling water (coolant) per the fuel assembly and provide a relative flow rate of the cooling water per the fuel assembly. Specifically, by reducing the resistance value of the orifice of the cooling water inlet located in the fuel support fitting into which the bottom of the fuel assembly, the thermal margin of which is to be improved, is inserted, it is possible to increase the flow rate of cooling water in the fuel assembly, the in-core fuel dwelling time of which is the first cycle, thereby improving the thermal margin.

However, if the flow rate of the cooling water supplied to a fuel assembly increases, void fraction of the fuel assembly decreases and neutrons are easily moderated. When neutrons are easily moderated in a soiling Water Reactor, nuclear fission is accelerated, increasing the power of the fuel assembly. For this reason, when the flow rate of the cooling water supplied to the fuel assembly increases, relative power of the fuel assembly simultaneously increases. Therefore, sufficient effects on the improvement of thermal margin were not obtained.

It is an object of the present invention to provide a reactor core which suppresses the increase in power of the fuel assembly resulting from the increase in the flow rate of the coolant in the fuel assembly, and improves the thermal margin.

The present invention for achieving the above object is characterized in that

A reactor core has an outermost region, a core region surrounded by the outermost region, a plurality of fuel support members, each of which is disposed at a lower end portion of the outermost region and the core region, and a plurality of fuel assemblies loaded in the outermost region and the core region and supported by each of the fuel support members, a plurality of the fuel assemblies disposed in the core region include a plurality of first fuel assemblies, each of which is inserted into a first coolant passage which is formed in the fuel support member and has a first resistor having an opening, and a plurality of second fuel assemblies, each of which is individually inserted into second coolant passages which is formed in the fuel support member and has a second resistor having an opening and a larger pressure loss than that of the first resistor; and, four fuel assemblies, each of which is adjacent to each of four lateral sides of each of a plurality of the first fuel assemblies, include either three or four second fuel assemblies.

Four fuel assemblies adjacent to four lateral sides of the first fuel assembly 10 inserted into the first cooling water passage, wherein the first resistor having smaller pressure loss than that of the second resistor is provided, include either three or four second fuel assemblies, each of which is individually inserted into the second cooling water passages wherein the second resistor is provided. Therefore, either three or four second fuel assemblies, wherein flow rate of the coolant is small and power is low, are adjacent to the first fuel assembly wherein flow rate of the coolant increases. For this reason, the power increase rate of the first fuel assembly, wherein flow rate of the coolant increases, is suppressed due to the influence of either three or four second fuel assemblies, and the thermal margin of the reactor core is increased.

When distance between a center of a core region and an axis of a fuel assembly located at the furthest position from the center of the core region within the core region is represented as L, the core region, which excludes an outermost region, includes an inner core region wherein fuel assemblies, each of which has the axis on an inner side of a $L/\sqrt{2}$ position in a radial direction of the core region from the center of the core region, are loaded, and the outer region surrounding the inner region, and when a number of first fuel assemblies among four fuel assemblies separately adjacent to four lateral sides of each of a plurality of first fuel assemblies is represented as $\alpha$, an average number $\alpha$ of first fuel assemblies in the inner region is 1 or less, the above-mentioned object of the present invention can be achieved.

By setting the average number $\alpha$ of the first fuel assemblies in the inner region at 1 or less, it is possible to further increase thermal margin of the core.

According to the present invention, it is possible to suppress the increase in the power of a fuel assembly resulting from the increase in the flow rate of the coolant in the fuel assembly, and improves the thermal margin.

DETAILED DESCRIPTION OF THE PREFERRED EMBODIMENTS

Inventors studied a method for suppressing the increase in power of fuel assembly when the flow rate of the coolant in the fuel assembly increases. For this study, the inventors focused attention on the fact that the increase in power of one fuel assembly is affected by the power of fuel assemblies surrounding the one fuel assembly. In the outermost layer region of the core, power becomes lower than that of the central portion of the core due to the effect of neutron leakage, therefore, it is not necessary to improve the thermal margin. For this reason, the inventors attempted to apply measures to suppress the increase in power of the fuel assembly located in the region on the inner side of the outermost layer region of the core when the flow rate of the coolant increases.

Figure 4:
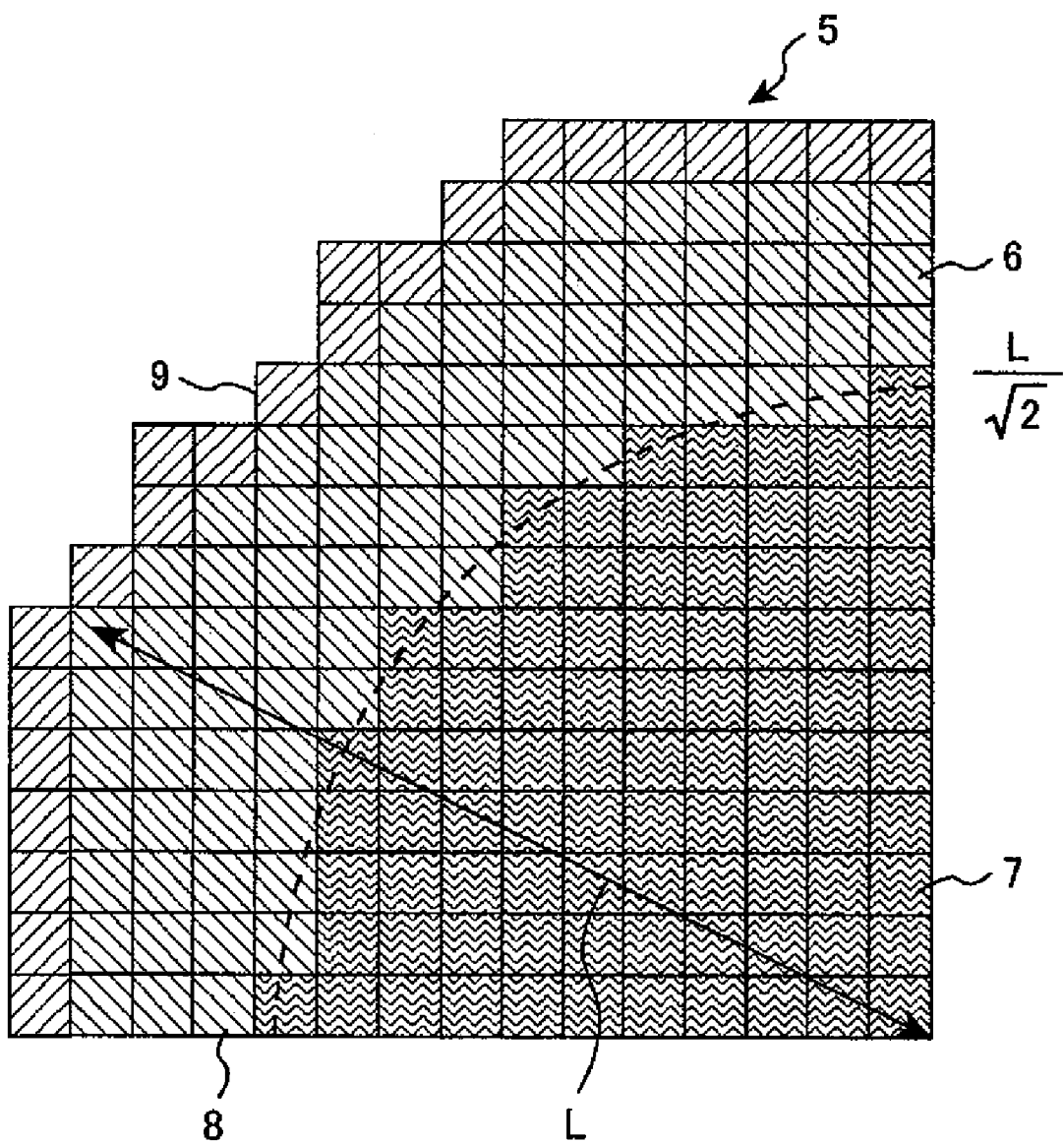
FIG. 4 is an explanatory drawing showing the inner core region, outer core region and the outermost layer region included in the reactor core.

As shown in FIG. 4, excluding fuel assemblies loaded in an outermost layer region 9 of the core 5, the distance between a center of the core and an axis of the fuel assembly loaded in the furthest position from the center of the core is L. The core 5 shown in FIG. 4 shows one fourths of the core. The outermost layer region 9 is made of one layer of fuel assemblies loaded in the outermost position of the core 5. The core 5 includes an inner core region 7 in which fuel assemblies, each of which has the axis on the inner side of the $L/\sqrt{2}$ position from the center of the core, are loaded, and an outer core region 8 located between the inner core region 7 and the outermost layer region 9. The inventors also studied and discussed situations in which the fuel assemblies having low thermal margin at the beginning and at the end of operation cycle are located in both the inner core region 7 and the outer core region 8 of the core 5.

Figure 6:
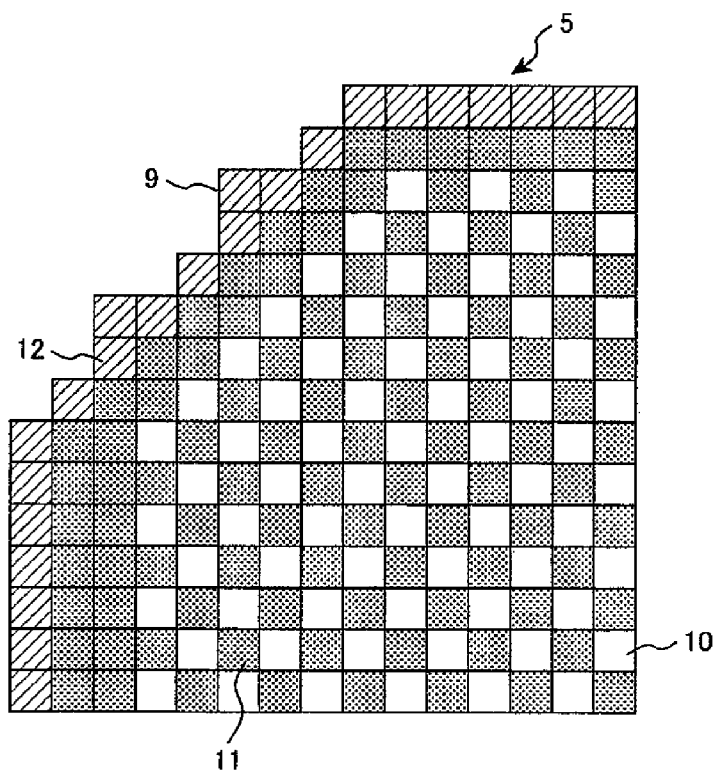
FIG. 6 is a structural diagram showing the arrangement of fuel assemblies in the reactor core wherein the average number of the former first fuel assemblies, each of which is inserted into the former low pressure loss cooling water passage shown in FIG. 5 is 0.

Focusing attention on the fact that the power of one fuel assembly is affected by the power of the fuel assemblies surrounding the one fuel assembly, The inventors perform classification of a plurality of fuel assemblies loaded in the inner core region 7 and the outer core region 8 respectively into two groups, that is, a plurality of fuel assemblies 10 of the first group and a plurality of fuel assemblies 11 of the second group as shown in FIG. 6. Those fuel assemblies are held by fuel supports (fuel support members) installed at the lower end portion of the core 5. Normally, one fuel support holds the lower end portion of four fuel assemblies and forms four cooling water passages that supply cooling water separately to each fuel assembly. An orifice (resistor having an opening) is installed at each inlet of the four cooling water passages provided in the fuel support. The pore diameter of the first orifice provided at the inlet of the cooling water passage (referred to as first cooling water passage) into which a lower end portion of a fuel assembly 10 is inserted is larger than the pore diameter of the second orifice provided at the inlet of the cooling water passage (referred to as second cooling water passage) into which a lower end portion of a fuel assembly 11 is inserted. That is, an orifice coefficient of the first orifice is smaller than that of the second orifice. In the fuel support which holds fuel assemblies 12 disposed in the outermost layer region 9, the orifice coefficient of the third orifice provided at the inlet of the cooling water passage (referred to as third cooling water passage) into which lower end portion of a fuel assembly 12 is larger than an orifice coefficient of the second orifice.

For example, the fuel assembly 10 is a fuel assembly that the in-core fuel dwelling time is a first cycle, the fuel assembly 11 is a fuel assembly that the in-core fuel dwelling time is a second cycle, and the fuel assembly 12 is a fuel assembly that the in-core fuel dwelling time is a third cycle. The fuel assemblies 11 are adjacent to the four lateral sides of the fuel assembly 10. Because the orifice coefficient of the first orifice is smaller than that of the second orifice, more cooling water is supplied to the fuel assembly 10 than the fuel assembly 11. Therefore, the power of the fuel assembly 10 will be increased. However, since the fuel assemblies 11 that the power is low are arranged adjacent fuel assembly 10 that the power is high, it is possible to prevent the power of the fuel assembly 10 from increasing.

Figure 5:
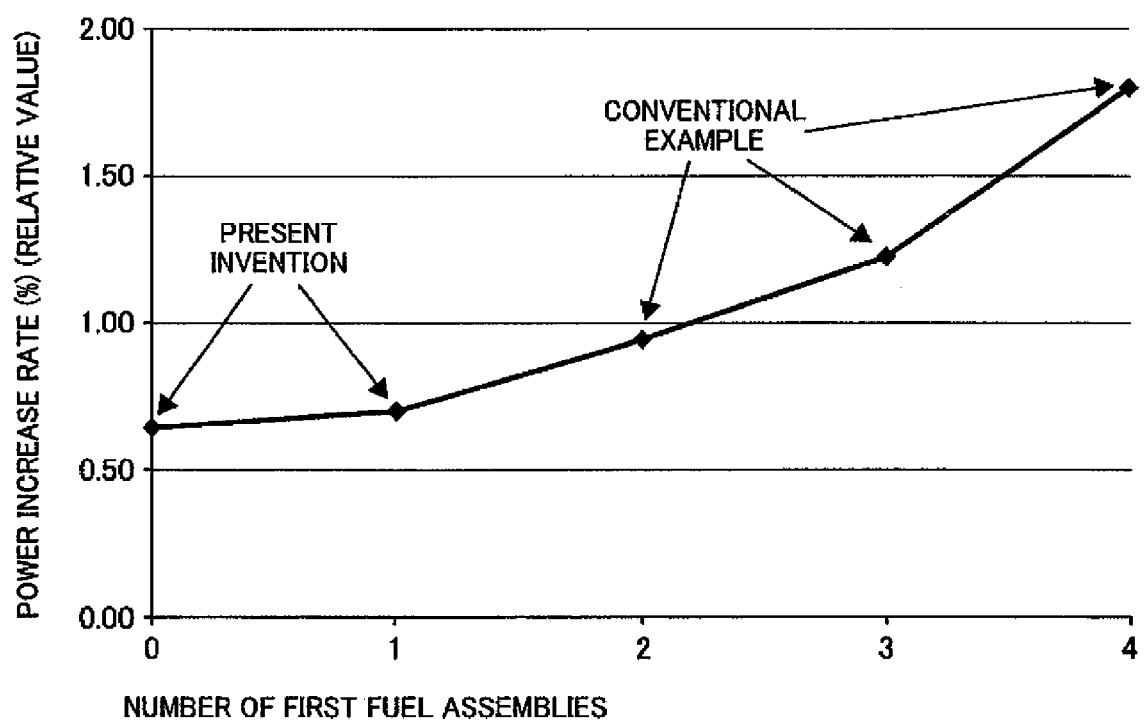
FIG. 5 is a characteristic diagram showing a relationship between the number of first fuel assemblies, each of which is individually inserted into a low pressure loss cooling water passage, which are adjacent to the lateral sides of another first fuel assembly inserted into another low pressure loss cooling water passage formed in the fuel support, and the power increase rate per another first fuel assembly.
Figure 7:
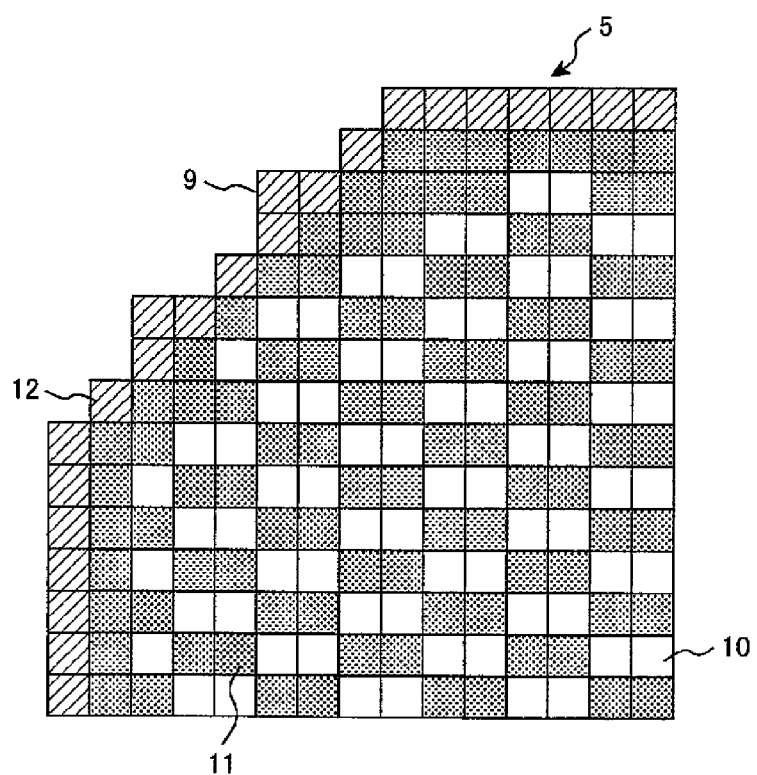
FIG. 7 is a structural diagram showing the arrangement of fuel assemblies in the reactor core wherein the average number of the former first fuel assemblies, each of which is inserted into the former low pressure loss cooling water passage shown in FIG. 5 is 1.
Figure 8:
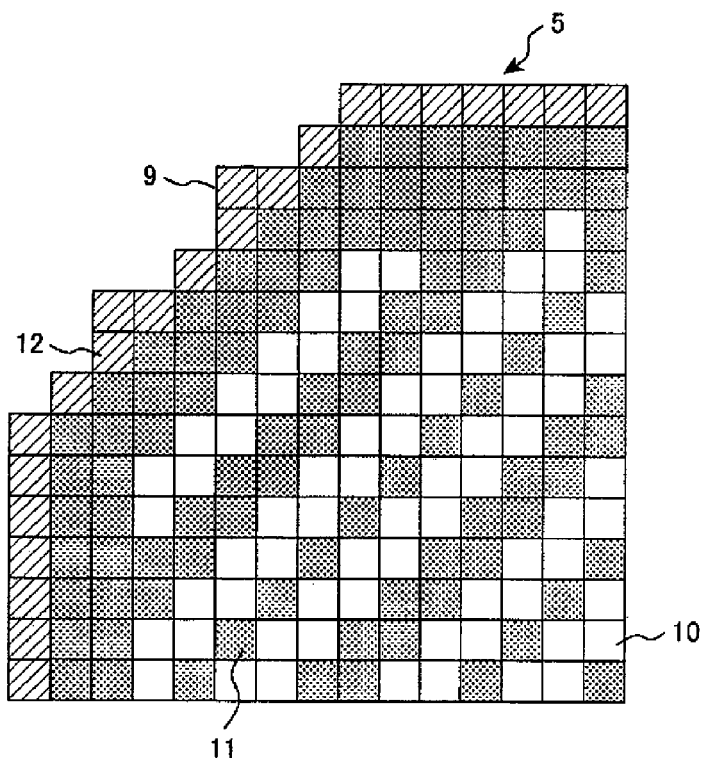
FIG. 8 is a structural diagram showing the arrangement of fuel assemblies in the reactor core wherein the average number of the former first fuel assemblies, each of which is inserted into the former low pressure loss cooling water passage shown in FIG. 5 is 2.
Figure 9:
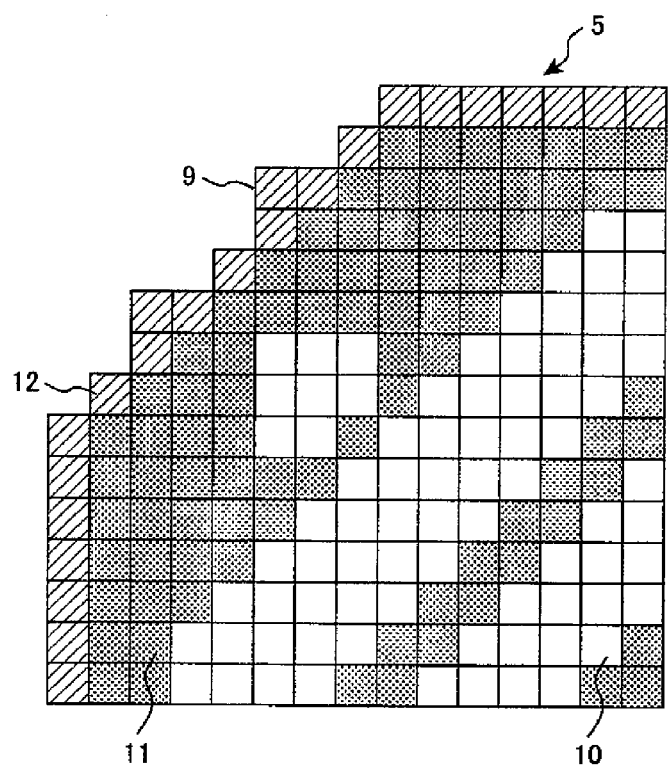
FIG. 9 is a structural diagram showing the arrangement of fuel assemblies in the reactor core wherein the average number of the former first fuel assemblies, each of which is inserted into the former low pressure loss cooling water passage shown in FIG. 5 is 3.
Figure 10:
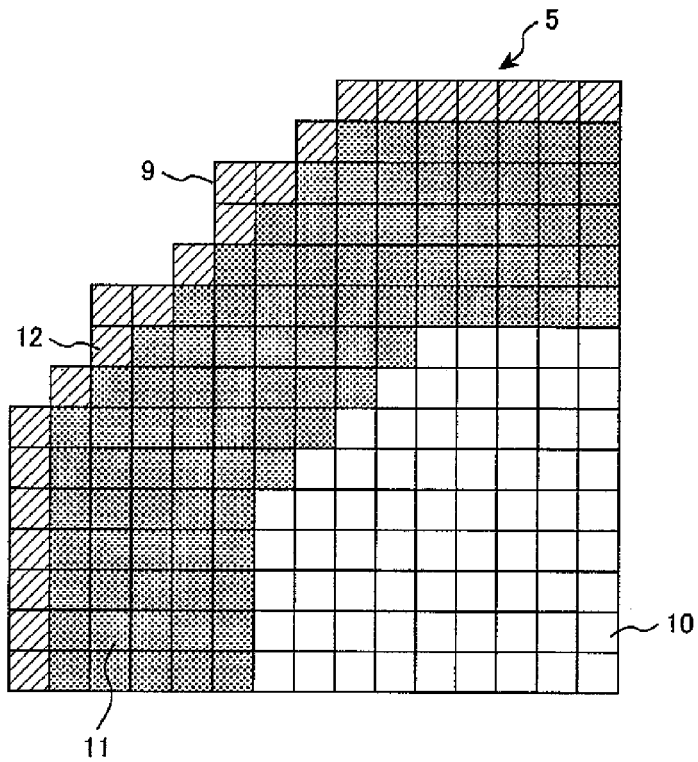
FIG. 10 is a structural diagram showing the arrangement of fuel assemblies in the reactor core wherein the average number of the former first fuel assemblies, each of which is inserted into the former low pressure loss cooling water passage shown in FIG. 5 is 4.

The inventors studied the change of the power increase rate of one fuel assembly 10 when the number of other fuel assemblies 10 adjacent to the former fuel assembly 10 is changed, and obtained new knowledge as shown in FIG. 5. The number of other fuel assemblies 10 adjacent to the one fuel assembly 10 is an average value of the core 5. FIG. 6 shows the arrangement of fuel assemblies 10 and 11 in the inner core region 7 and the outer core region 8 when the number of other adjacent fuel assemblies 10 is 0. That is, there are no other fuel assemblies 10 adjacent to four lateral sides of one fuel assembly 10. The arrangement of the first and second orifices is the same as that of the fuel assemblies 10 and 11. FIG. 7 shows the arrangement of fuel assemblies 10 and 11 when the number of other adjacent fuel assemblies 10 is 1, that is, when another fuel assembly 10 is adjacent to one lateral side of one fuel assembly 10. FIG. 8 shows the arrangement of fuel assemblies 10 and 11 when the number of other adjacent fuel assemblies 10 is 2. FIG. 9 shows the arrangement of fuel assemblies 10 and 11 when the number of other adjacent fuel assemblies 10 is 3. FIG. 10 shows the arrangement of fuel assemblies 10 and 11 when the number of other adjacent fuel assemblies 10 is 4.

The core 5 is a BWRS type core loaded with 764 fuel assemblies, and the electric power of the BWR incorporating the core 5 is 1.1 million kW. With regard to the orifice coefficient of each orifice provided in each fuel support located at the lower end portion of the core 5, excluding the third orifice, when compared with the core having a uniform orifice coefficient, the orifice coefficient of the first orifice is −38%, and that of the second orifice is +32%. However, pressure loss of the entire core 5 is equivalent to that of the core having a uniform orifice coefficient.

In the core described in Japanese Patent Laid-open No. Hei 7(1995)-181280, there is a mixture of fuel assemblies in the high flow rate region 22 and fuel assemblies in the low flow rate region 21. The orifice coefficient of the orifice which corresponds to the fuel assembly in the high flow rate region 22 is larger than the orifice coefficient of the orifice which corresponds to the fuel assembly in the low flow rate region 21. The average number of fuel assemblies (other fuel assemblies in the high flow rate area 22) adjacent to the lateral sides of one fuel assembly in the high flow rate region 22 is about two to four.

In situations (see FIG. 5) in which the number of fuel assemblies 10 adjacent to the lateral sides of one fuel assembly 10 is different, the increase rate of the average flow rate of cooling water supplied to the fuel assembly 10 is about 7.5% when compared with the core having a uniform orifice coefficient. Herein, since the increase in power of the one fuel assembly is as shown in FIG. 5, for example, when the number of other adjacent fuel assemblies 10 shown in FIG. 10 is 4, the thermal margin increases by 0.5% when compared with the core having a uniform orifice coefficient. On the other hand, when the number of other adjacent fuel assemblies 10 shown in FIG. 6 is 0, the thermal margin increases by 2.1% when compared with the core having a uniform orifice coefficient. Based on the new knowledge shown in FIG. 5, the inventors found that if the number of other fuel assemblies 10 adjacent to one fuel assembly 10 is one or less, in other words, if the number of fuel assemblies 11, which has lower power than that of the fuel assembly 10, adjacent to the one fuel assembly 10 is three or four, it is possible to suppress the power increase rate in the fuel assembly 10 when compared with the conventional example. Setting the number of other fuel assemblies 10 adjacent to one fuel assembly 10 at 1 or less also means that four fuel assemblies adjacent to the four lateral sides of the one fuel assembly includes either three or four fuel assemblies 11.

By disposing half of the fuel assemblies 10 among all of the fuel assemblies 10 located in either the inner core region, or the inner core region and the outer core region so that each of the above half of the fuel assemblies 10 is adjacent to one or zero other fuel assemblies 10, the inventors newly found that it is possible to suppress the increase in the power of the fuel assembly 10 in which flow rate of supplied cooling water increases. Embodiments which are based on this perspective will be described below.

Embodiment 1

Figure 1:
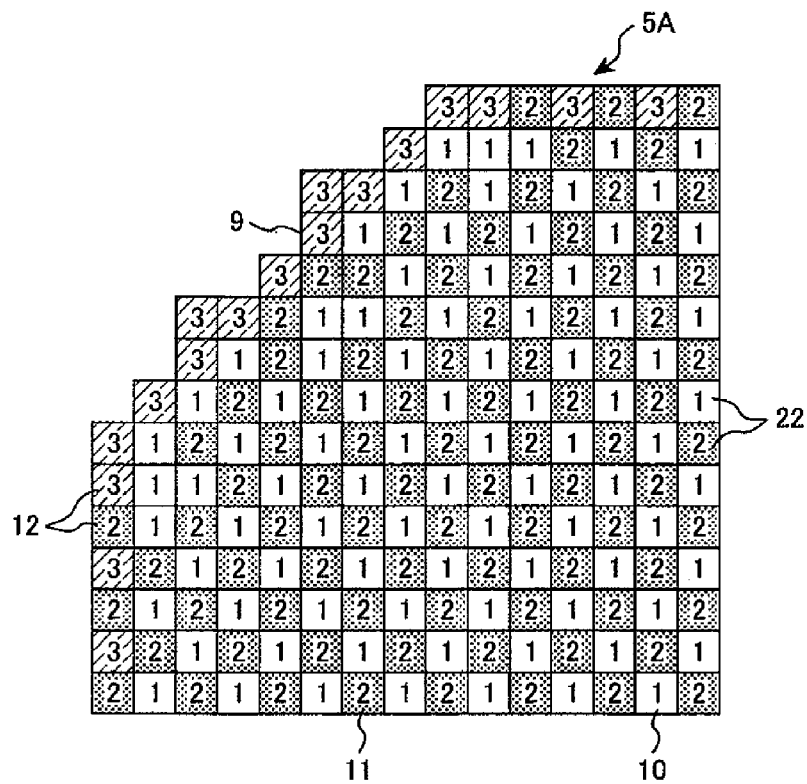
FIG. 1 is a ¼ cross-sectional diagram showing a reactor core of embodiment 1 applied to a BWR, which is a preferred embodiment of the present invention.
Figure 2:
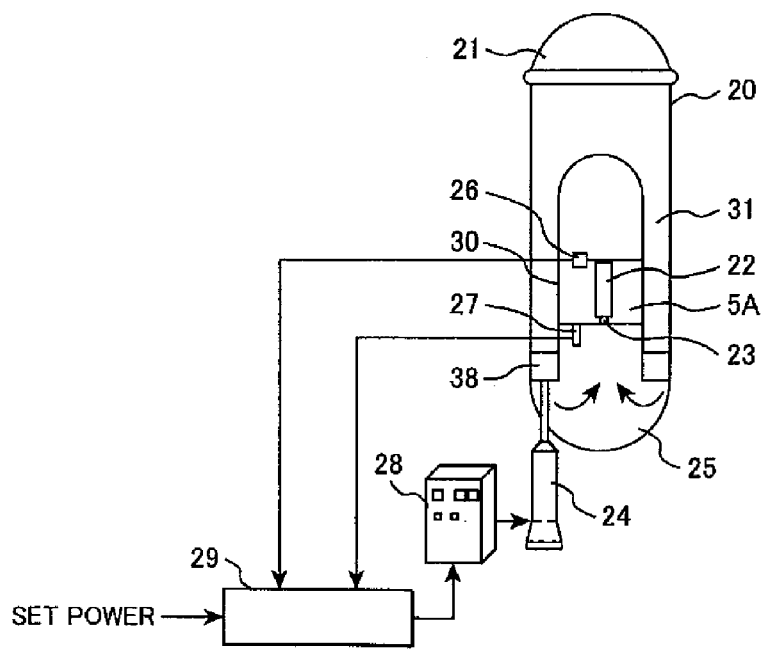
FIG. 2 is a structural diagram showing the BWR plant to which the reactor core shown in FIG. 1 is applied.

A reactor core applied to a Boiling Water Reactor (BWR) plant, which is a preferred embodiment of the present invention, will be explained with reference to FIGS. 1 to 3. First, structure of the BWR system to which the reactor core of the present embodiment is applied will be described. The BWR plant comprises a reactor 20 including a reactor pressure vessel (hereafter, referred to as RPV) 21, an inverter power supply apparatus 28 and a core flow rate control apparatus 29 and the like. The reactor 20 has the core 5A arranged in the RPV 21, and a neutron detector 26 and a flowmeter 27 are provided in the RPV 21. The core 5A is enclosed in the core shroud 30 provided in the RPV 21. A steam separator (not shown) and a dryer (not shown) are disposed at the upper part of the core 5A inside the RPV 21. A plurality of internal pumps 24 are installed in the RPV 21, an impeller 38 of each internal pump 24 is disposed in an annular down comer 31 formed between the RPV 21 and the core shroud 30. A plurality of fuel assemblies 22 are loaded in the core 5A, the lower end portion of each fuel assembly 22 is held by a fuel support 23 provided at the lower end portion of the core 5A. One fuel support 23 holds four fuel assemblies 22. When one fuel support 23 cannot hold four fuel assemblies 22 in the periphery portion of the core 5A, in some cases, one fuel support holds one fuel assembly 22. In the inside of the fuel support 23 which holds four fuel assemblies 22, there are provided four cooling water passages (not shown) which individually supply cooling water to each fuel assembly 22. An orifice (not shown) is installed at the inlet of each cooling water passage. A fuel support which holds one fuel assembly has one cooling water passage in which an orifice is provided at the inlet so as to supply cooling water to the fuel assembly.

In most of the fuel supports 23 disposed in the inner core region 7 and the outer core region 8 of the core 5A, two first cooling water passages and two second cooling water passages are formed. A first orifice is provided at the inlet of the first cooling water passage, and a second orifice is provided at the inlet of the second cooling water passage. The lower end portion of fuel assembly 10 is inserted into the first cooling water passage, the lower end portion of fuel assembly 11 is inserted into the second cooling water passage, and each fuel assembly 10, 11 is held by a fuel support 23.

Figure 3:
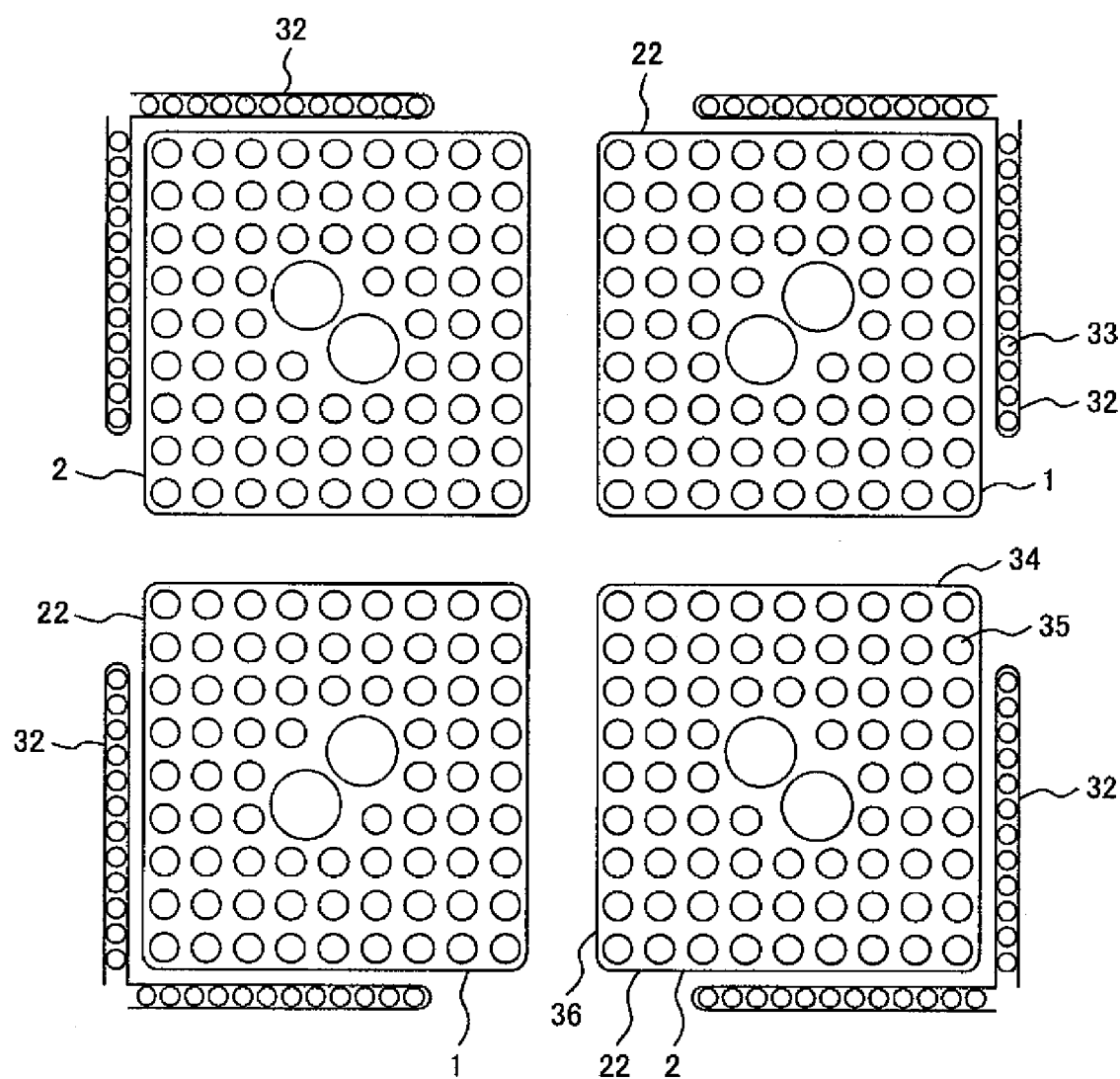
FIG. 3 is a partially enlarged view showing the reactor core shown in FIG. 1.

FIG. 3 shows a partial cross-section of the core 5A. A plurality of control rods 32 are disposed in the core 5A. The cross-section of the control rod 32 is cruciform and the control rod 32 includes a plurality of neutron absorbing rods 33. The neutron absorption rod 33 is filled with $B_4C$. Four fuel assemblies 22 are disposed so that they surround one control rod 32. Four fuel assemblies 22 that surround one control rod 32 forms a cell 34. The core 5A includes a plurality of cells 34. The fuel assembly 22 has 74 fuel rods 35 disposed in a square lattice form of 9 lines and 9 columns in a cylindrical channel box 36 having a square cross-section. Each fuel rod 35 is filled with a plurality of fuel pellets including nuclear fuel material. The lower end portion of four fuel assemblies 22 that surround one control rod 32 to form a cell 34 is held by one fuel support 23. The number of operation cycles of the fuel assembly 22, which indicates that the fuel assembly 22 dwelled in the core 5A while the reactor was in operation, is different as described later. In the state of new fuel assembly that burn-up is 0, average uranium enrichment of those fuel assemblies 22 is about 4%, and average discharged burn-up is about 45 GWd/t.

By withdrawing a plurality of control rods 32 from the core 5A, reactor power increases. By driving an internal pump 24, the cooling water inside the down comer 31 is pressurized. The cooling water discharged from the impeller 38 is introduced into each fuel assembly 22 through the lower plenum 25 and each cooling water passage formed in the fuel supports 23. The cooling water is heated by heat generated by nuclear fission of nuclear fuel material in the fuel assembly 22, and a part of it changes to steam. Moisture included in the steam is removed by a separator and a dryer and then supplied to a turbine (not shown) from the RPV 21. The turbine is rotated by the steam, and a power generator (not shown) connected to the turbine is also rotated. The steam discharged from the turbine is condensed by the condenser (not shown) to become water. The condensed water is supplied to the RPV 21 as feed water.

The core flow rate control apparatus 29 calculated the reactor power based on neutron fluxes measured by each neutron detector 26 and controls the inverter power supply apparatus 28 based on the obtained reactor power and the core flow rate measured by the flowmeter 27. By this control, the inverter power supply apparatus 28 regulates electric current supplied to the internal pump 24 and adjust revolutions of the internal pump 24. Thus, the core flow rate control apparatus 29 adjusts revolutions of the internal pump 24 and controls the core flow rate. The core flow rate is a flow rate of cooling water supplied to the core.

The arrangement of fuel assemblies 22 in the core 5A which is a reactor core of the present embodiment will be described with reference to FIG. 1. The core 5A is loaded with 764 fuel assemblies 22 and has 191 control rods 32. Electric power of the BWR plant that uses a reactor 20 having the core 5A which is a BWR5 type core is 1.1 million kW. One operation cycle is 24 months, and the batch number for fuel exchange is 2.2 batches. Fuel exchange is conducted during the reactor shutdown period between an operation cycle and the next operation cycle. Excluding the outermost layer region 9 of the core 5A, 764 fuel assemblies 22 loaded in the core 5A are arranged such that a plurality of fuel assemblies 10 of the first group and a plurality of fuel assemblies 11 of the second group, as mentioned above, are arranged in the inner core region 7 and the outer core region 8 (see FIG. 4 for these regions) surrounded by the outermost layer region 9. The outermost layer region 9 is formed by a layer of fuel assemblies 22 loaded in the outermost position of the core 5A. The inner core region 7 of the present embodiment is a region in which fuel assemblies 22, each of which has the axis on the inner side of the $L/\sqrt{2}$, position from the center of the core 5A, are loaded. The outer core region 8 is located between the inner core region 7 and the outermost layer region 9.

The core 5A are loaded with fuel assemblies 22 which are experiencing the operation in the first operation cycle (referred to as fuel assemblies of a first in-core fuel dwelling time), fuel assemblies 22 which have been experienced the operation in the first operation cycle and are experiencing the operation in the second operation cycle (referred to as fuel assemblies of a second in-core fuel dwelling time), and fuel assemblies 22 which have been experienced the operation in the second operation cycle and are experiencing the operation in the third operation cycle (referred to as fuel assemblies of a third in-core fuel dwelling time). In FIG. 1, "1" represents the fuel assemblies 22 of a first in-core fuel dwelling time, "2" represents the fuel assemblies 22 of a second in-core fuel dwelling time, and "3" represents the fuel assemblies 22 of a third in-core fuel dwelling time. These expressions are the same in embodiments 2 through 5 described later. A plurality of fuel assemblies 22 loaded in the outermost layer region 9 of the core 5A, that is, a plurality of fuel assemblies 12 include the fuel assemblies 2 of the second in-core fuel dwelling time and the fuel assemblies 3 of the third in-core fuel dwelling time. All fuel assemblies 10 arranged in the inner core region 7 and the outer core region 8 of the present embodiment are fuel assemblies 1 of the first in-core fuel dwelling time. All fuel assemblies 11 arranged in the inner core region 7 and the outer core region 8 of the present embodiment are fuel assemblies 2 of the second in-core fuel dwelling time. The content of fissile material and the power of the fuel assembly become lower in sequential order of the fuel assemblies 1, the fuel assemblies 2, and the fuel assemblies 3.

The pore diameter of the first orifice provided at the inlet of the first cooling water passage formed in the fuel support 23 is larger than the pore diameter of the second orifice provided at the inlet of the second cooling water passage formed in the fuel support 23. This means that the orifice coefficient of the first orifice is smaller than that of the second orifice. In the fuel support which holds fuel assemblies 12 including the fuel assemblies 2 and 3 arranged in the outermost layer region 9, the orifice coefficient of the third orifice provided at the inlet of the third cooling water passage inserting the lower end portion of the fuel assembly 12 is larger than the orifice coefficient of the second orifice. This is because the quantity of neutrons that leak from the fuel assemblies 12 arranged in the outermost layer region 9 to the outside of the core 5A is the greatest and the power of the fuel assemblies 12 decreases. With regard to the orifice coefficient of each orifice provided in each fuel support located at the lower end portion of the core 5A, excluding the third orifice, when compared with the core having a uniform orifice coefficient, the orifice coefficient of the first orifice is −38% and that of the second orifice is +32%. The orifice coefficient of the first orifice is smaller than that of the second orifice. However, pressure loss of the entire core 5 is equivalent to that of the core having a uniform orifice coefficient.

The present embodiment is characterized in that other fuel assemblies 22, excluding the fuel assemblies 12 loaded in the outermost layer region 9 of the core 5A, include the fuel assemblies 10, each of which is inserted into the first cooling water passage having the first orifice, in which pressure loss is smaller than that of the core average, and the fuel assemblies 11, each of which is inserted into the second cooling water passage having a second orifice, in which pressure loss is larger than that of the core average, and other fuel assemblies 10 are not adjacent to the four lateral sides that form four sides of one fuel assembly 10. No fuel assemblies 10 are adjacent to the lateral sides of the one fuel assembly 10. The average number α of adjacent fuel assemblies in this case is 0. Herein, being adjacent to the lateral side of the fuel assembly means being adjacent to the fuel assembly in the direction of the arrangement of the fuel assemblies that are arranged on the lattice-like. A fuel assembly 11 having a lower infinite multiplication factor than that of the fuel assembly 10 is adjacent to (face-to-face with) each of the four lateral sides of the one fuel assembly 10. Moreover, in two diagonal directions of the fuel assembly 10, other four fuel assemblies 10 are arranged in four corner portions of the fuel assembly 10 so that the corner portions are adjacent to each other. The number 22 denotes the fuel assembly.

In both the inner core region 7 and the outer core region 8, the number of other fuel assemblies 10 face-to-face-to-face with each the lateral sides of the one assembly 10 is substantively 0, and the average number α of adjacent fuel assemblies is also 0. In the present embodiment, fuel assembly 22, the in-core fuel dwelling time of which is shorter than that of the core average, is fuel assembly 10.

When compared to the core having a uniform orifice coefficient, excluding the outermost layer region, in the present embodiment, the average increase rate of the flow rate of cooling water in each fuel assembly 10 is about 7.5%, however, power increase rate of each fuel assembly 10 can be suppressed to 0.6%. When four fuel assemblies adjacent to the one fuel assembly 10 are all fuel assemblies 10, the power increase rate of the one fuel assembly 10 is 1.8, and in the present embodiment, it is suppressed to 0.6%. Therefore, the thermal margin of the core 5A increases by about 2%.

In the present embodiment, four low power fuel assemblies 11, each of which is inserted into the second cooling water passage having a second orifice, are adjacent to four lateral sides of a fuel assembly 10 inserted into the first cooling water passage in which the first orifice, the orifice coefficient of which is smaller than that of the second orifice, is provided. The flow rate of the cooling water supplied to the fuel assembly 10 increases and the power of the fuel assembly 10 also increases. The flow rate of cooling water supplied to the fuel assemblies 11 is less than that of the fuel assembly 10, and the power of the fuel assemblies 11 is lower than that of the fuel assembly 10. As a result, although the flow rate of the cooling water in the fuel assembly 10 increases, four low power fuel assemblies 11 are individually adjacent to the lateral sides of the fuel assembly 10, therefore, the power increase rate of the fuel assembly 10 is suppressed as stated above. Consequently, the thermal margin of the core 5A increases by about 2%.

Japanese Patent Laid-open No. Hei 7(1995)-181280 focuses attention on the improvement of the thermal margin by increasing the flow rate of the cooling water supplied to the fuel assembly. On the other hand, the present embodiment focuses on the suppression of the power increase rate, and by considering the suppression of the power increase rate, it is possible to further increase the thermal margin.

Embodiment 2

Figure 11:
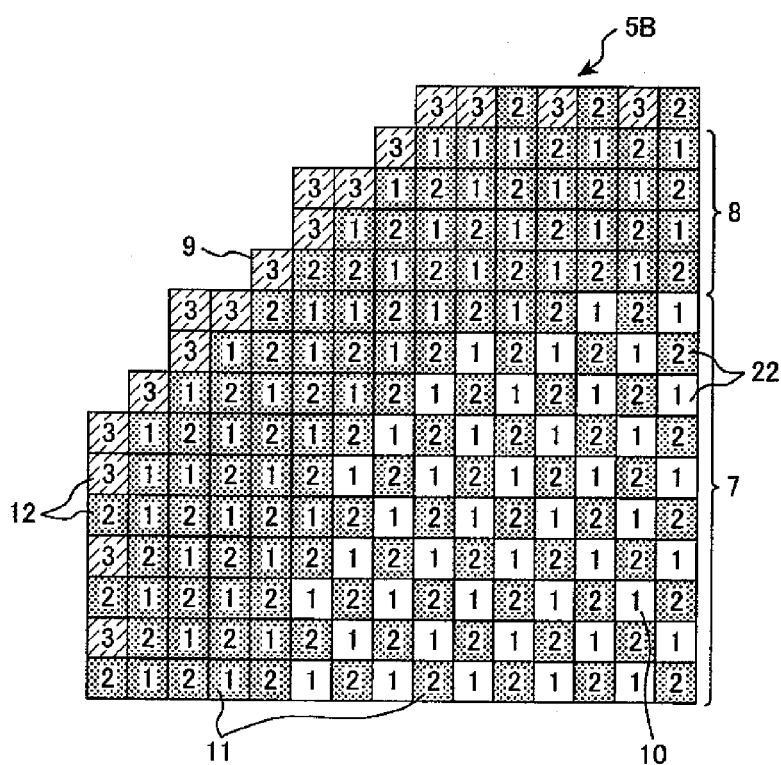
FIG. 11 is a ¼ cross-sectional diagram showing a reactor core of embodiment 2 applied to a BWR, which is another embodiment of the present invention.

A reactor core of embodiment 2 applied to a BWR, which is another embodiment of the present invention, will be described with reference to FIG. 11. The BWR plant using the core 5B has a reactor 20 shown in FIG. 2 and equipped with the core 5B. In the core 5B of the present embodiment, a plurality of fuel assemblies 10 and 11 are arranged in the inner core region 7 in which fuel assemblies 22, each of which has the axis on the inner side of the L/√2 position from the center of the core 5B, are loaded, and instead of providing fuel assemblies 10, a plurality of fuel assemblies 11 are arranged in the outer core region 8 located between the inner core region 7 and the outermost layer region 9. The structure of other portions of the BWR plant incorporating the core 5B is the same as that of embodiment 1. A plurality of fuel assemblies 11 arranged in the outer core region 8 include fuel assemblies 1 and fuel assemblies 2. In most fuel assemblies 1 loaded in the outer core region 8, a fuel assembly 2 is adjacent to each of four lateral sides of the fuel assembly 1. Lower end portion of Each of those fuel assemblies 1 and 2 is inserted into the second cooling water passage in which the second orifice is provided at the inlet.

In the inner core region 7, in the same manner as the inner core region 7 of the embodiment 1, fuel assemblies 11 are adjacent to four lateral sides of a fuel assembly 10. This means that other fuel assemblies 10 are not adjacent to the four lateral sides of the one fuel assembly 10. Therefore, the average number α of adjacent fuel assemblies in the inner core region 7 is 0. Fuel assembly 10 arranged in the inner core region 7 is the fuel assembly 1 and the fuel assembly 11 is fuel assembly 2. The lower end portion of fuel assembly 1 in the inner core region 7 is inserted into the first cooling water passage. Furthermore, the lower end portion of the fuel assembly 2 in the inner core region 7 is inserted into the second cooling water passage.

In the present embodiment, in the same manner as the embodiment 1, when compared with the core having a uniform orifice coefficient excluding the outermost layer region, average increase rate of the flow rate of the cooling water in each fuel assembly 10 is about 7.5%, but the power increase rate of each fuel assembly 10 is suppressed to 0.6%. Therefore, the thermal margin of the core 53 increases by about 2%. In the present embodiment, even when the flow rate of the cooling water in the fuel assembly 10 is increased, for the same reason as the embodiment 1, it is possible to increase the thermal margin when compared to the core in which pressure drop coefficient of the orifice is uniform.

Embodiment 3

Figure 12:
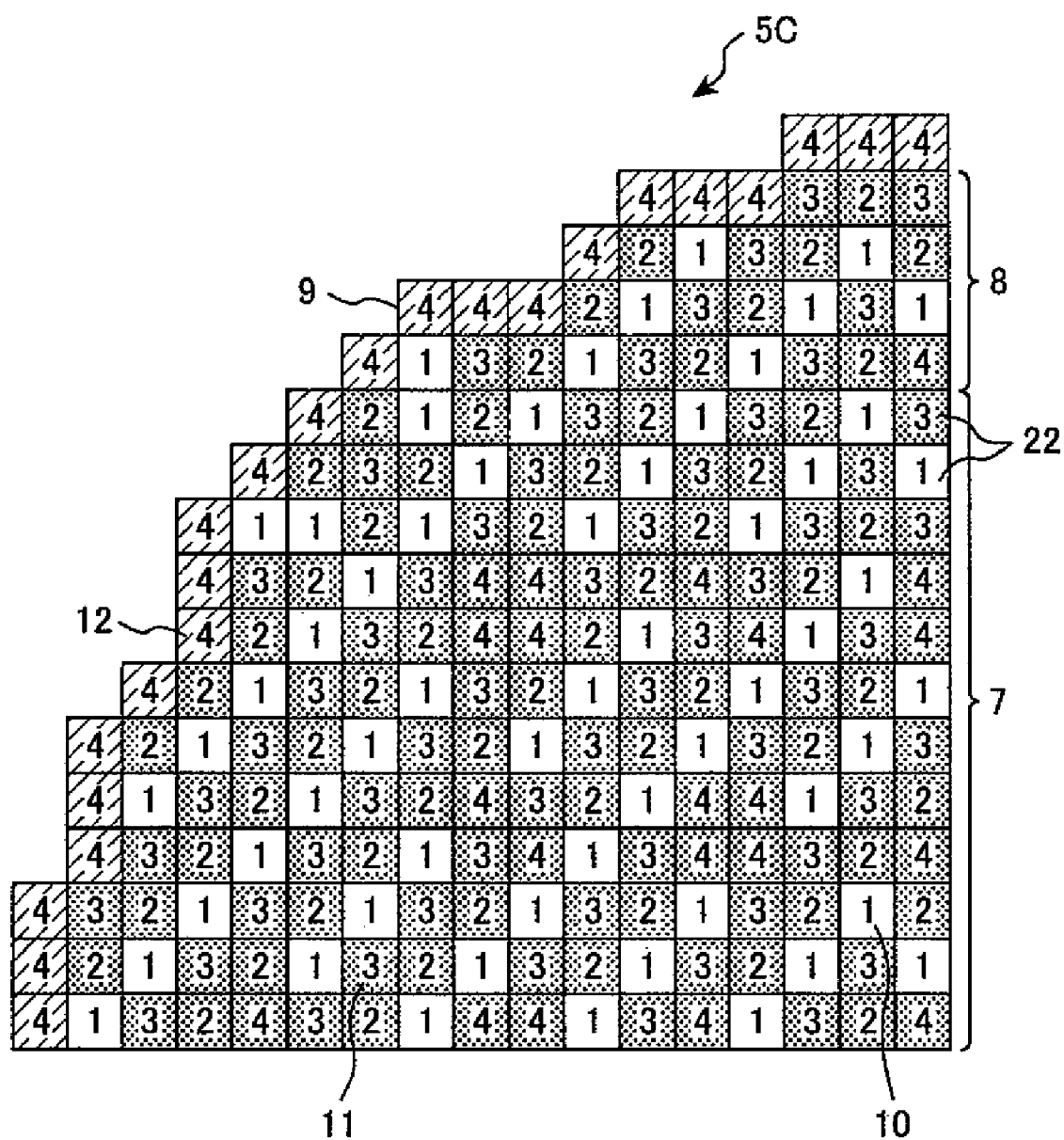
FIG. 12 is a ¼ cross-sectional diagram of a reactor core of embodiment 3 applied to an ABWR, which is another embodiment of the present invention.

A reactor core of embodiment 3 applied to a BWR, which is another embodiment of the present invention, will be described with reference to FIG. 12. In the core 5C of the present embodiment, fuel assemblies 10 and 11 are arranged in the inner core region 7 and the outer core region 8, respectively, which are surrounded by the outermost layer region 9. The BWR plant which incorporates the core 5C is an ABWR plant that has an ABWR as a reactor 20. The ABWR plant also has the same structure as that of BWR plant of the embodiment 1 shown in FIG. 2 except for the core 5C and a recirculation system. The ABWR has internal pumps instead of jet pumps. The core 5C is an ABWR type core.

Electric power of the ABWR plant is 1.35 million kW, and the core 5C is loaded with 872 fuel assemblies 22 that the average discharged burn-up is 45 GWd/t. There are provided 218 control rods 32, and hafnium type neutron absorption members are provided instead of neutron absorption rods 33. One operation cycle is 15 months, and batch number for fuel exchange is 3.8 batches. Therefore, in the core 5C, in addition to fuel assemblies 1, 2 and 3, fuel assemblies 22 which have been experienced the operation in the third operation cycle and are experiencing the operation in the fourth operation cycle (referred to as fuel assemblies of a fourth in-core fuel dwelling time) are loaded.

The fuel assemblies 4 of a fourth in-core fuel dwelling time are loaded in the outermost layer region 9 of the core 5C. A plurality of the fuel assemblies 10 and a plurality of the fuel assemblies 11 are arranged in the inner core region 7 and the outer core region 8 surrounded by the outermost layer region 9. A plurality of the fuel assemblies 10 are the fuel assemblies 1. A plurality of the fuel assemblies 11 include the fuel assemblies 2, 3, and 4. Four fuel assemblies 11 are adjacent to four lateral sides of one fuel assembly 10. The lower end portion of the fuel assembly 1 which is the fuel assembly 10 is inserted into the first cooling water passage in which the first orifice is provided at the inlet. The lower end portion of each of the fuel assemblies 2, 3, and 4 which are fuel assemblies 11 is inserted into the second cooling water passage in which the second orifice is provided at the inlet.

With regard to the orifice coefficient of each orifice provided in the fuel support 23, excluding the third orifice located in the outermost layer region 9, when compared with the core having a uniform orifice coefficient, the orifice coefficient of the first orifice is −41% and that of the second orifice is +19%. The orifice coefficient of the third orifice is larger than that of the second orifice. Pressure loss of the entire core 5C is equivalent to that of the core having a uniform orifice coefficient.

Four fuel assemblies 11 are separately adjacent to four lateral sides of the one fuel assembly 10. Those fuel assemblies 11 adjacent to four lateral sides of the one fuel assembly 10 are at least two different types of fuel assemblies 22, the in-core fuel dwelling time of which is different from that of most fuel assemblies 10. Some of fuel assemblies 10 located in the periphery portion of the outer core region 8 are arranged such that one of four lateral sides is adjacent to a fuel assembly 10. The average number α of adjacent fuel assemblies located in the inner core region 7 and the outer core region 8 of the core 5C is almost 0.

In the present embodiment, when compared with the core having a uniform orifice coefficient excluding the outermost layer region 9, average increase rate of the flow rate of the cooling water in each fuel assembly 10 is about 4.3%, however, power increase rate of each fuel assembly 10 is suppressed to 0%. As a result, the thermal margin of the core 5C increases by about 2%. Even in the core, the batch number of which is close to 4 batches, it is possible to improve the thermal margin of the core when the flow rate of the cooling water in the fuel assembly 10 is increased. In the present embodiment, even if the size of the core or batch number for fuel exchange are changed, the above advantages can be obtained.

Embodiment 4

Figure 13:
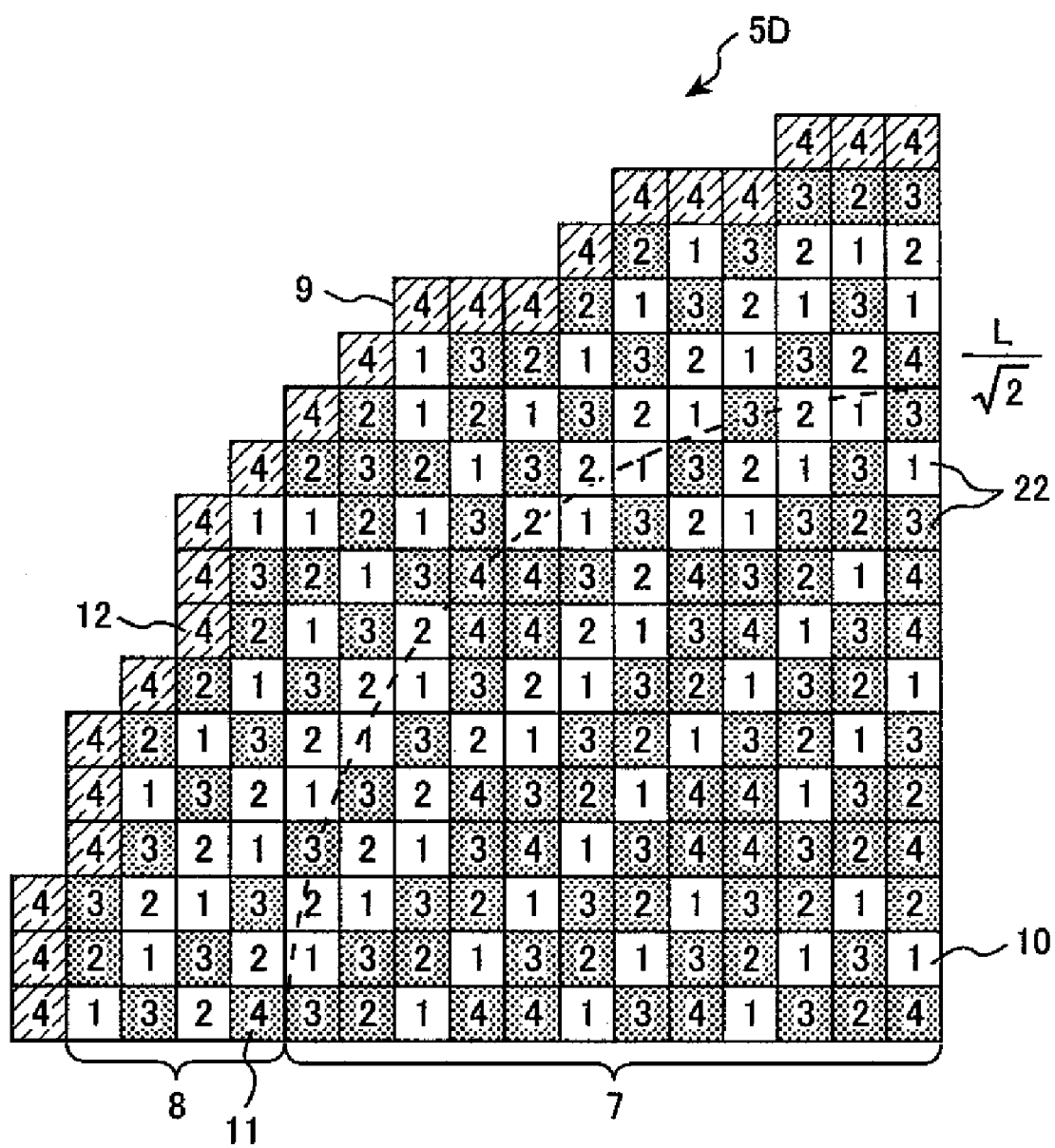
FIG. 13 is a ¼ cross-sectional diagram of a reactor core of embodiment 4 applied to an ABWR, which is another embodiment of the present invention.

A reactor core of embodiment 4 applied to a BWR, which is another embodiment of the present invention, will be described with reference to FIG. 13. In the core 5D of the present embodiment, fuel assemblies 10 and 11 are arranged in the inner core region 7 and the outer core region 8, respectively, which are surrounded by the outermost layer region 9. In the same manner as embodiment 3, the BWR plant which incorporates the core 5D is an ABWR plant that has an ABWR as a reactor 20. The ABWR plant also has the same structure as that of the BWR plant of embodiment 1 shown in FIG. 2 except for the core 5D. The core 5D is an ABWR type core. With regard to the difference between core 5D and core 5C, the arrangement of fuel assemblies 22 and the orifice coefficient are different, and the fuel assemblies 10 of the core 5D include fuel assemblies 2.

The core 5D also includes the inner core region 7 in which fuel assemblies 22, each of which has the axis on the inner side of the L/$\sqrt{2}$ position from the center of the core 5B, are loaded, and the outer core region 8 located between the inner core region 7 and the outermost layer region 9. In the inner core region 7 of the core 5D, excluding a part of the periphery portion of the inner core region 7, the fuel assemblies 10 and fuel assemblies 11 are arranged in the same manner as the inner core region 7 of the core 5C. In the part of the periphery portion of the inner core region 7 of the core 5D, the fuel assemblies 2 which are the fuel assemblies 10 are arranged. Therefore, in the part of the periphery portion of the inner core region 7, each of the fuel assemblies 2 which are the fuel assemblies 10 is adjacent to each of two lateral sides of one fuel assembly 1 which is the fuel assembly 10. In most of the inner core region 7 of the core 5D excluding the periphery portion, the fuel assemblies 11 are adjacent to four lateral sides of the one fuel assembly 1 which is the fuel assembly 10. Therefore, the average number α of adjacent fuel assemblies located in the inner core region 7 is almost 1.

The outer core region 8 of the core 5D includes the first arrangement wherein the fuel assemblies 2 which are the fuel assemblies 10 are adjacent to two lateral sides of one fuel assembly 1 which is the fuel assembly 10, and the second arrangement wherein the fuel assemblies 11 are adjacent to four lateral sides of one fuel assembly 1 which is the fuel assembly 10. In this second arrangement, no other fuel assemblies 10 are arranged so that they are adjacent to four lateral sides of one fuel assembly 10. In the outer core region 8, the number of the second arrangements is larger than the number of the first arrangements. The first arrangement is located on the outermost layer region 9 side and the second arrangement is located on the inner core region 7 side. The average number α of adjacent fuel assemblies in the outer core region 8 is almost 1.5.

The lower end portion of each of the fuel assemblies 1 and 2 which are the fuel assemblies 10 is inserted into the first cooling water passage, and the lower end portion of each of the fuel assemblies 2, 3, and 4 which are the fuel assemblies 11 is inserted into the second cooling water passage. With regard to the orifice coefficient of each orifice provided in the fuel support 23, excluding the third orifice located in the outermost layer region 9, when compared with the core having a uniform orifice coefficient, the orifice coefficient of the first orifice is −41% and that of the second orifice is +32%. The orifice coefficient of the third orifice is larger than the second orifice. Pressure loss of the entire core 5D is equivalent to that of the core having a uniform orifice coefficient.

In the present embodiment, in the central portion of the inner core region 7, all of the four fuel assemblies adjacent to one fuel assembly 10 are the fuel assemblies 11. Furthermore, as described later, if the fuel assemblies 11 are used for two fuel assemblies adjacent to the fuel assembly 10 of the second in-core fuel dwelling time located in the outer periphery portion of the inner core region 7, when compared with the core having a uniform orifice coefficient excluding the outermost layer region, the average increase rate of the flow rate of the cooling water in each fuel assembly 10 is about 4.5%. However, the power increase rate of each fuel assembly 10 is suppressed to 0.6%. As a result, the thermal margin of the core 5D increases by about 2%.

When the thermal margin of the fuel assembly of the second in-core fuel dwelling time located in the outer periphery portion of the inner core region 7 is low, in the present embodiment, the lower end portion of the fuel assembly 11 of the second in-core fuel dwelling time is inserted into the first cooling water passage in which the first orifice is provided. By doing so, with regard to the fuel assembly 10 of the second in-core fuel dwelling time located in the outer periphery portion of the inner core region 7, by using other fuel assemblies 10 for two fuel assemblies adjacent to one fuel assembly 10 of the second in-core fuel dwelling time, in other words, by using the fuel assemblies 11 for two other fuel assemblies adjacent to the one fuel assembly 10, as shown in FIG. 5, it is possible to suppress the power increase rate of the fuel assembly 10 of the second in-core fuel dwelling time.

Embodiment 5

Figure 14:
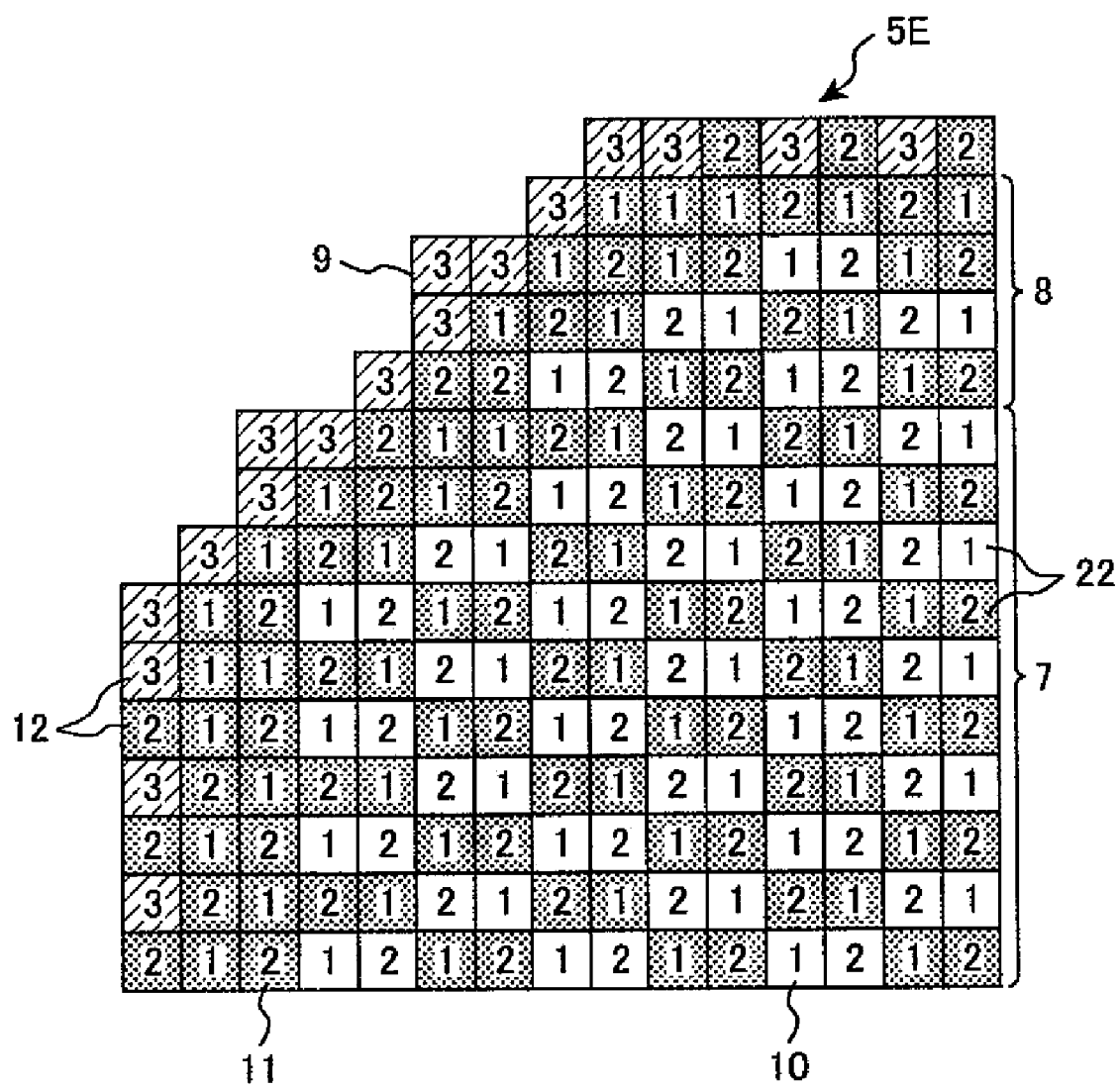
FIG. 14 is a ¼ cross-sectional diagram of a reactor core of embodiment 5 applied to a BWR, which is another embodiment of the present invention.

A reactor core of embodiment 4 applied to a BWR, which is another embodiment of the present invention, will be described with reference to FIG. 14. In the core 5E of the present embodiment, fuel assemblies 10 and 11 are arranged in the inner core region 7 and the outer core region 8, respectively, which are surrounded by the outermost layer region 9. The BWR plant which incorporates the core 5E has a reactor 20 equipped with the core 5E and shown in FIG. 1. In the same manner as embodiment 1, the boundary between the inner core region 7 and the outer core region 8 of the core 5E is the L/$\sqrt{2}$ point from the center of the core 5E.

Fuel assemblies 2 and 3 are arranged in the outermost layer region 9 of the core 5E. Both fuel assemblies 10 and fuel assemblies 11 include the fuel assemblies 1 and fuel assemblies 2. In the inner core region 7 of the core 5E, all fuel assemblies 10 are arranged such that one lateral side of each fuel assembly 10 is adjacent to another fuel assembly 10. That is, one fuel assembly 2 which is fuel assembly 10 is adjacent to one lateral side of a certain fuel assembly 1 which is fuel assembly 10. Three fuel assemblies 2 which are fuel assemblies 11 are individually adjacent to other three lateral sides of one fuel assembly 1 which is fuel assembly 10. Three fuel assemblies 1 which are fuel assemblies 11 are individually adjacent to other three lateral sides of one fuel assembly 2 which is fuel assembly 10. The average number α of adjacent fuel assemblies located in the inner core region 7 is almost 1.

In the same manner as the inner core region 7, in most of the outer core region 8, a fuel assembly 2 which is another fuel assembly 10 is adjacent to one lateral side of one fuel assembly 1 which is fuel assembly 10. The average number α of adjacent fuel assemblies located in the outer core region 8 is almost 1.

The lower end portion of each of fuel assemblies 1 and 2 which are fuel assemblies 10 is inserted into the first cooling water passage, and the lower end portion of each of fuel assemblies 1 and 2 which are fuel assemblies 11 is inserted into the second cooling water passage. With regard to the orifice coefficient of each orifice provided in the fuel support 23, excluding the third orifice located in the outermost layer region 9, when compared with the core having a uniform orifice coefficient, the orifice coefficient of the first orifice is −38% and the second orifice is +33%. The orifice coefficient of the third orifice is larger than the second orifice. Pressure loss of the entire core is equivalent to that of the core having a uniform orifice coefficient.

In the present embodiment, when compared with the core having a uniform orifice coefficient excluding the outermost layer region 9, average increase rate of the flow rate of cooling water in each fuel assembly 10 is about 6.5%, however, power increase rate of each fuel assembly 10 is suppressed to 0.7%. Thermal margin of the core 5E increases by about 2%.

In the core 5E, it is possible to arrange a plurality of fuel assemblies 11 in the outer core region 8 instead of arranging fuel assemblies 10 and arrange a plurality of fuel assemblies 10 and 11 in the inner core region 7. In the inner core region 7, another fuel assembly 10 is adjacent to one lateral side of a fuel assembly 10, and fuel assemblies 11 are adjacent to other three lateral sides of the fuel assembly 10.

What is claimed is:
1. A reactor core comprising:
an outermost region;
a core region surrounded by said outermost region;
a plurality of fuel support members, each of which is disposed at a lower end portion of said outermost region and said core region; and
a plurality of fuel assemblies loaded in said outermost region and said core region and supported by said fuel support members;

wherein a plurality of said fuel assemblies disposed in said core region include a plurality of first fuel assemblies, each of which is inserted into a first coolant passage which is formed in said fuel support member and has a first resistor having an opening, and a plurality of second fuel assemblies, each of which is individually inserted into each of a second coolant passage which is formed in said fuel support member and has a second resistor having an opening and a larger pressure loss than that of said first resistor; and four fuel assemblies, each of which is adjacent to each of four lateral sides of each of a plurality of first fuel assemblies in said core region, include at least three second fuel assemblies;

wherein when a distance between a center of said core region and an axis of said fuel assembly located at a furthest position from said center of said core region among all of said fuel assemblies adjacent to said outermost region and disposed in said core region is represented as L, said core region includes an inner region wherein said fuel assemblies, each of which has said axis on an inner side of a $L/\sqrt{2}$ position in a radial direction of said core region from said center of said core region, are loaded, and an outer region surrounding said inner region; and wherein said first fuel assemblies and said second fuel assemblies are arranged in said inner region, and said second fuel assemblies are arranged in said outermost region which has no said first fuel assemblies therein.

2. The reactor core according to claim 1, wherein when said four fuel assemblies adjacent to said four lateral sides of said first fuel assembly include three said second fuel assemblies adjacent to three of said four lateral sides of said first fuel assembly, and an other fuel assembly among said four fuel assemblies which is one said first fuel assembly adjacent to a fourth of said four lateral sides of said first fuel assembly.

3. The reactor core according to claim 1, wherein said first fuel assemblies, each of which is adjacent to said at least three of said second fuel assemblies, are all of said first fuel assemblies arranged in said inner region.

4. The reactor core according to claim 1, wherein said first fuel assemblies, each of which is adjacent to said at least three of said second fuel assemblies, are all of said first fuel assemblies arranged in said inner region.

5. The reactor core according to claim 1, wherein said first fuel assembly is a fuel assembly having an in-core fuel dwelling time which is shorter than that of a core average.

6. The reactor core according to claim 1, wherein each of said four fuel assemblies adjacent to said four lateral sides of said first fuel assembly is said second fuel assembly. *

7. A reactor core, comprising:

an outermost region;

a core region surrounded by said outermost region;

a plurality of fuel support members, each of which is disposed at a lower end portion of said outermost region and said core region; and a plurality of fuel assemblies loaded in said outermost region and said core region and supported by said fuel support members;

wherein a plurality of said fuel assemblies disposed in said core region include a plurality of first fuel assemblies, each of which is inserted a first coolant passage which is formed in said fuel support member and has a first resistor having an opening, and a plurality of second fuel assemblies, each of which is inserted into each of a second coolant passage which is formed in said fuel support members and has a second resistor having an opening and a larger pressure loss than that of said first resistor;

wherein when a distance between a center of said core region and an axis of said fuel assembly located at a furthest position from said center of said core region among all of said fuel assemblies adjacent to said outermost region and disposed in said core region is represented as L, said core region includes an inner region wherein said fuel assemblies, each of which has said axis on an inner side of a $L/\sqrt{2}$ position in a radial direction of said core region from said center of said core region, are loaded, and an outer region surrounding said inner region;

wherein when a number of said second fuel assemblies among four of said fuel assemblies separately adjacent to four lateral sides of each of said first fuel assemblies is represented as α, an average number α in said inner region of said core region is no greater than 0; and wherein said second fuel assemblies are arranged in said outermost region which has no said first fuel assemblies therein.

* * * * *